United States Patent
Brown et al.

[11] 3,710,589
[45] Jan. 16, 1973

[54] BOWL ASSEMBLY FOR CHILLING SALADS OR THE LIKE

[75] Inventors: Gordon R. Brown, La Puente; Margaret E. Michalek, Huntington Beach, both of Calif.

[73] Assignee: All-Power Manufacturing Co., Montebello, Calif. ; by said Brown

[22] Filed: April 5, 1971

[21] Appl. No.: 131,088

[52] U.S. Cl. ...................62/457, 62/458, 62/459, 62/371
[51] Int. Cl. ............................................F25d 3/08
[58] Field of Search.........62/457, 458, 371, 372, 459

[56] References Cited

UNITED STATES PATENTS

| | | | |
|---|---|---|---|
| 1,393,235 | 10/1921 | Mitrovich | 62/457 |
| 3,130,288 | 4/1964 | Monaco | 62/457 |
| 3,413,820 | 12/1968 | Pagnen | 62/371 |

*Primary Examiner*—William J. Wye
*Attorney*—William P. Green

[57] ABSTRACT

A bowl assembly including a first bowl in which a salad or the like is to be placed, and a second bowl within which the first bowl is at least partially received, in a manner leaving a space between the bowls for holding water which is to be frozen to maintain the salad in chilled condition, and with interfitting detents being provided on the two bowls for releasably retaining them in assembled relation. The lower bowl may also function when desired as a cover for the main bowl, or alternatively a separate cover may be provided.

16 Claims, 6 Drawing Figures

PATENTED JAN 16 1973 3,710,589
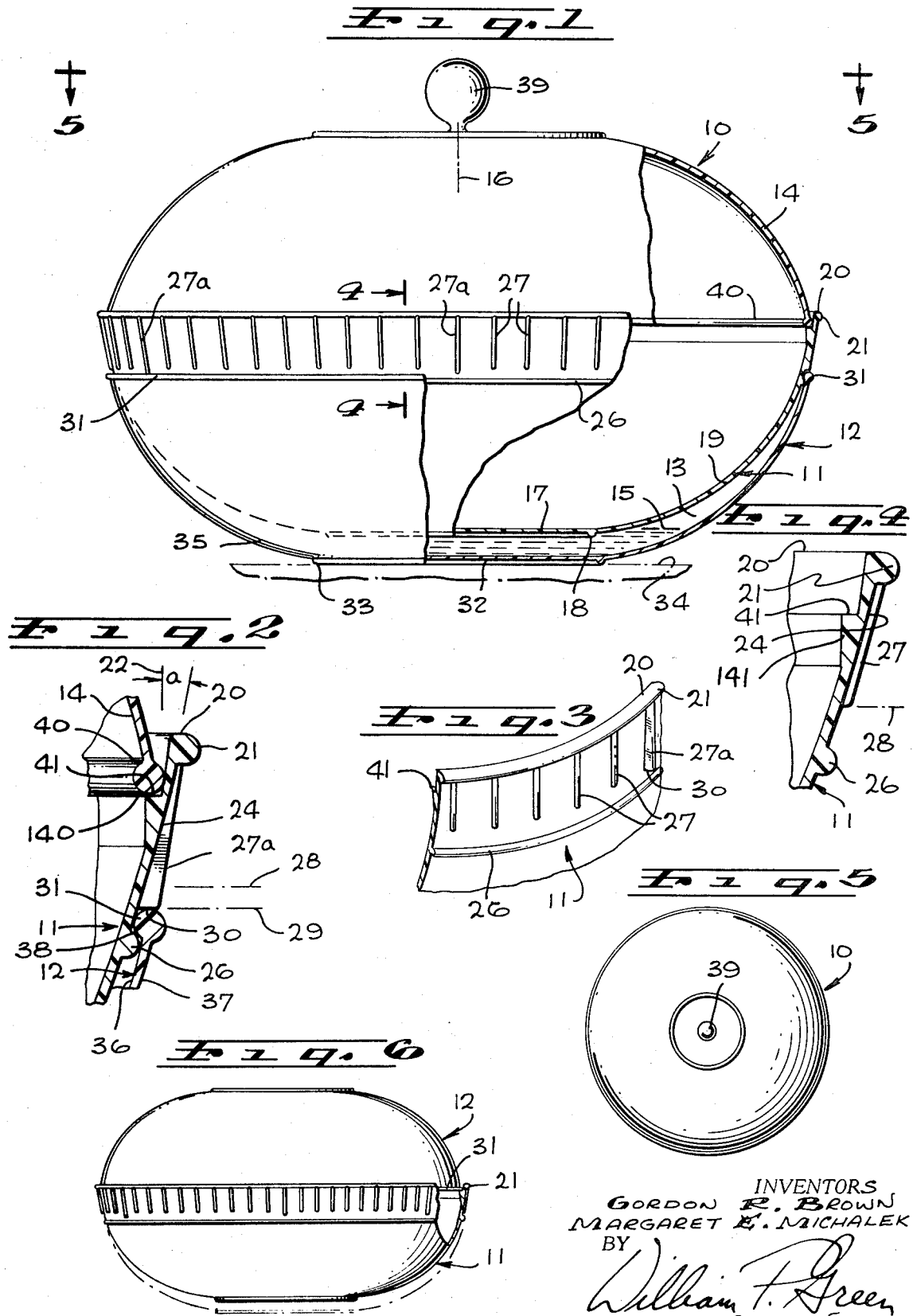
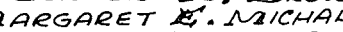

BOWL ASSEMBLY FOR CHILLING SALADS OR THE LIKE

BACKGROUND OF THE INVENTION

This invention relates to improved bowl assemblies for maintaining a salad or other prepared dish at a predetermined temperature. The invention is in certain respects especially useful for chilling or icing such a dish, and will be described primarily as applied to that use.

Many types of salads are considered most appetizing when maintained in chilled or cooled condition until eaten. Conditions, however, often render it very difficult to keep such a salad and its bowl cool prior to or during the serving of a meal. Even if the bowl is initially chilled before the salad is placed in it, conventional types of bowls are usually incapable of maintaining the bowl and contents at a low temperature for any substantial period of time.

SUMMARY OF THE INVENTION

The present invention provides a unique bowl assembly which is so constructed that it can very effectively chill a salad or other dish, and can maintain the salad in cool condition for an extended period of time in spite of subjection to elevated ambient temperatures. To achieve this purpose, the assembly includes two bowls one of which is received within the other in a relation forming a space between the two bowls within which water can be received and then frozen to the condition of ice. This ice will thus function as a cooling body of very substantial heat capacity capable of maintaining the bowl and its contents in chilled condition for an extended period of time.

The two bowls are releasably held together in assembled relation by detenting means, so that the bowls may be handled as a unit without coming apart. The detenting elements may be formed as snap detent shoulders on the two bowls which deform slightly in passing one another upon assembly of the bowls together and then yieldingly retain the bowls against separation. More particularly, the inner bowl may have a laterally projecting annular rib engageable with an inwardly projecting annular rib or projection formed at the upper edge of the second bowl. The inner bowl desirably projects upwardly beyond the upper edge of the outer bowl, and may have shoulders engageable with the upper edge of the outer bowl to limit its relative upward movement.

For protecting the contents of the bowl assembly when desired, a cover may extend across the top of the primary bowl. If desired, the outer one of the two previously mentioned bowls may be removed from its lower position and be placed on the top of the main bowl in inverted condition to itself serve as the cover.

BRIEF DESCRIPTION OF THE DRAWING

The above and other features and objects of the invention will be better understood from the following detailed description of the typical embodiments illustrated in the accompanying drawing in which:

FIG. 1 is a front elevational view, partially broken away in vertical section, of a salad icing bowl assembly constructed in accordance with the invention;

FIG. 2 is an enlarged fragmentary vertical section showing the detenting engagement in the right portion of FIG. 1;

FIG. 3 is an enlarged fragmentary perspective representation of the detenting elements of the main or inner bowl;

FIG. 4 is a fragmentary vertical section taken on line 4—4 of FIG. 1;

FIG. 5 is a reduced plan view taken on line 5—5 of FIG. 1; and

FIG. 6 shows a variational arrangement similar to that of FIG. 1, except that the outer bowl in inverted condition is itself utilized as the cover of the main or primary bowl.

DESCRIPTION OF THE PREFERRED EMBODIMENTS

Referring first to FIG. 1, we have designated generally by the numeral 10 a bowl assembly which is constructed in accordance with the invention, and is adapted typically for holding a chilled tossed salad or the like. Assembly 10 includes a first main bowl 11, a second outer bowl 12 shaped to define a space 13 between the two bowls, and a cover 14. All of these parts may be formed of appropriate molded resinous plastic materials which may be fairly stiff to hold their illustrated shapes in handling, but which at the same time may be very slightly resiliently deformable in order that the later-to-be-discussed detenting ribs or shoulders may interengage in a snap detenting relation for releasably securing the parts in assembled condition when desired. In the presently preferred arrangement, the parts 11, 12, and 14 are all molded from high impact polystyrene, with parts 11 and 14 preferably being colored and opaque, and with the outer or under bowl 12 desirably being formed of a transparent high impact polystyrene, such as that sold by Dow Chemical Company as "Tyral 4420". The substances of which the three parts 11, 12, and 14 are formed are also so selected as to withstand low temperatures, down to a temperature as low as or beneath the freezing temperature of water (32° Fahrenheit), without breakage or other damage to parts 11, 12, and 14, so that water may be frozen to ice in the space 13 as represented at 15 in FIG. 1.

To now describe the shape of the primary bowl 11 in somewhat greater detail, this bowl is circular and symmetrical about a vertical axis 16. The bowl may have a horizontal bottom wall 17 at whose periphery there is formed a small circular downwardly projecting support bead 18 centered about axis 16 and adapted to rest on a horizontal support surface when bowl 11 is utilized separately from the outer bowl 12. Radially outwardly beyond the location of rib 18, bowl 11 may be shaped to form a side wall 19 of the bowl which is annular and centered about vertical axis 16 and curves gradually and progressively upwardly to an upper annular top edge 20 of the bowl. At that top edge, the bowl has an outwardly projecting top annular rim 21, centered about axis 16 and having the vertical cross sectional configuration shown in FIG. 2. Immediately beneath this top rim 21, the major portion of the outer surface 24 of side wall 19 of the bowl is disposed at a slightly upward flaring angularity $a$ with respect to a true vertical line 22.

At a location spaced beneath top rim 21 of bowl 19, the outer surface 24 of that bowl is shaped to define an annular radially outwardly projecting snap detenting rib 26, which is centered about vertical axis 16 and coacts with the upper edge of outer bowl 12 in retaining relation. As seen in FIG. 2, this rib or projection 26 is rounded in vertical section, to be relatively easily cammed slightly radially inwardly, against the resilience of the material forming bowl 11 and rib 26, when the two bowls are moved into and out of interfitting connected relation. Above detent rib 26, the outer surface 24 of the bowl carries a series of evenly circularly spaced vertical ribs 27, which at their upper ends may merge with the radially outwardly projecting portion of top rim 21. The lower ends of most of these vertical ribs 27 may terminate at a lever 28, but some of the ribs (those designated 27a in the figures) may project downwardly slightly beyond the location 28 to the level 29 of FIG. 2, to define at their lower ends downwardly facing stop shoulders 30 which are engageable with the upper surfaces of a top rim 31 of bowl 12 to prevent upward movement of bowl 12 relative to bowl 11 beyond the position of FIGS. 1 and 2. To assure effective engagement of ribs 27a with the lower bowl, the ribs 27a may increase progressively in radial thickness as they advance downwardly, in order that the bottom shoulders or ends 30 may have substantial radial extent. The other vertical ribs 27, on the other hand, may be of uniform radial thickness along their entire height. Preferably, the stop ribs 27a are provided at a series of evenly circularly spaced locations about the periphery of the bowl, typically at six such locations spaced 60° apart.

With reference to the details of construction of the outer or under bowl 12, this bowl like the first discussed bowl 11 may have a horizontal planar circular bottom wall 32, of the same diameter as bottom wall 17 of bowl 11, and having a downwardly projecting annular support rib 33 at its periphery, for engagement with a table or other support surface 34. Radially outwardly beyond rib 33, the annular side wall 35 of bowl 12 curves gradually and progressively upwardly in a manner very similar to and generally parallel to, but converging gradually toward, the side wall of bowl 11. Wall 35 terminates upwardly at the previously mentioned annular top rim or edge 31 of bowl 12. This top rim 31 is of course centered about vertical axis 16, and in vertical section is rounded and substantially circular as seen in FIG. 2. Immediately beneath rim 31 the inner and outer surfaces 36 and 37 of the bowl extend generally vertically but at an outwardly flaring angularity approximately the same as the angularity a of FIG. 2. Rim 31 projects radially inwardly beyond the immediately adjacent portion of inner surface 36, to form an inwardly projecting annular detent bead or rib 38 which is rounded at both its upper and lower sides. The normal internal diameter to which this inwardly projecting portion of rim 31 tends to return by its own resilience is slightly less than the normal maximum external diameter to which rib 26 of bowl 11 tends to return by its own resilience, so that when bowl 11 is placed downwardly into bowl 12, the ribs 26 and 38 engage and are cammed past one another in snap detenting relation, with rib 26 moving radially inwardly a short distance and rib 38 being deflected slightly radially outwardly. Thus, in the assembled condition of FIGS. 1 and 2, the two bowls 11 and 12 are retained against separation, and can be handled together as a unit without coming apart unintentionally, with bowl 11 being retained against relative upward movement by the discussed engagement of rib 26 with top rim 31 of bowl 12, and with bowl 11 being retained against relative downward movement by the previously mentioned engagement of shoulders 30 on ribs 27a at circularly spaced locations with the top of rim 31 of bowl 12. The spacing between shoulders 30 and rib 26 is just sufficient to receive rim 31 of bowl 12 therebetween, with little or no freedom for play remaining.

Cover 14, like the two bowls 11 and 12, is circular and symmetrical about vertical axis 16, and is adapted to fit into the top rim 21 of bowl 11. A handle 39 may be connected to and project upwardly from cover 14 for holding it and moving it onto and off of the bowl assembly. As the wall of cover 14 advances radially outwardly, it may curve gradually and progressively downwardly, to ultimately form a peripheral circular bottom rim or edge 40 centered about axis 16 and having the rounded vertical cross sectional configuration illustrated in FIG. 2. This rounded rim 40 may project both radially inwardly and radially outwardly beyond the immediately adjacent portions of the inner and outer surfaces of the cover, and has an annular undersurface 140 engageable downwardly against an annular upwardly facing support shoulder 41 formed within bowl 11 on an inner annular thickened portion 141 thereof at a location recessed downwardly beneath top edge 20 of the bowl, to support the cover in the FIGS. 1 and 2 closed position on bowl 11.

If desired, the bowl assembly may be provided or utilized without cover 14 and with the two bowls 11 and 12 being so constructed that the bottom bowl 12 in inverted condition will itself function as a cover for the top or primary bowl 11. This relationship is illustrated in FIG. 6, in which the bowl 12 is shown inverted, with its peripheral rim 31 engaging support shoulder 41 in bowl 11. bowl 11

In using bowls 11 and 12 for maintaining a salad in chilled condition, water may first be filled into the lower portion of bowl 12, to a level such as that shown in FIG. 1, and bowl 11 may then be placed in bowl 12 and connected thereto in the FIG. 1 condition by forcing rim 31 of bowl 12 past rib 26 of bowl 11. The connected bowls, either with or without cover 11, may then be placed in the freezer compartment of a refrigerator, to freeze the water in space 13 to the condition of ice. The bowls may then be removed, and a salad may be placed in bowl 11, to be retained in chilled condition by the ice. If the salad is to be left for a substantial period of time before use, cover 14 may be applied to the bowl assembly to further protect the salad and assist in maintaining it at a low temperature. After use, the three parts of the bowl assembly may be separated very easily for cleaning. If the separate cover 14 is not provided in a particular situation, bottom bowl 12 may be placed over bowl 11 as a cover in the FIG. 6 relation, after the water has melted or in an instance in which refrigeration may not be desired.

While certain specific embodiments of the present invention have been disclosed as typical, the invention is of course not limited to these particular forms, but rather is applicable broadly to all such variations all fall within the scope of the appended claims.

We claim:

1. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall and said second bowl having a side wall projecting upwardly about said side wall of the first bowl, said detent means including a detent element carried by said first side wall and projecting outwardly therefrom for detenting engagement with said second side wall.

2. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall, and said second bowl having a side wall projecting upwardly about said first side wall, said detent means including a detent element projecting inwardly from said second side wall for detenting engagement with said first side wall.

3. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall, and said second bowl having a side wall projecting upwardly about said first side wall, said detent means including a snap detent lug projecting outwardly from said first side wall, and an interengaging snap detent lug projecting inwardly from said second side wall for engagement with said first lug.

4. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upper edge portion projecting upwardly beyond the upper edge of said second bowl in said assembled condition of the two bowls.

5. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having a side wall projecting upwardly beyond said second bowl, said second bowl having a side wall projecting upwardly at the outside of said first side wall, said detent means including an inwardly projecting detent lug near an upper edge of said second side wall engageable in detenting relation with said first side wall at a location spaced beneath the upper edge of said first side wall to releasably retain the two bowls in said assembled condition.

6. The combination as recited in claim 5, in which said detent means include a detent lug on said first side wall projecting radially outwardly at said location spaced beneath the upper edge of said first side wall for snap detenting engagement with said lug on the second side wall.

7. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, therebeing shoulders on said bowls limiting movement of said first bowl downwardly into said second bowl to thereby assure maintenance of said ice space between the bowls.

8. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having outwardly projecting generally vertical ribs with lower ends forming shoulders engageable downwardly against an upper edge of said second bowl to limit movement of said first bowl downwardly into the second bowl.

9. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall with a top portion projecting upwardly beyond said second bowl in said assembled condition of the bowls, said second bowl having a side wall projecting upwardly at the outside of said first side wall, said detent means including an annular snap detent rib projecting outwardly from said first side wall at a location beneath said top portion thereof, and an annular second rib projecting inwardly from the upper edge of said second side wall and engageable in snap detent relation with said first rib in said assembled condition, said top portion of said first side wall having circularly spaced vertical ribs with lower ends spaced above said annular first rib and engageable with an upwardly facing surface at the top edge of said second side wall in a relation limiting downward movement of said first bowl into said second bowl in said assembled condition.

10. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said second bowl being adapted to be received in inverted condition over said first bowl as a cover therefor.

11. The combination as recited in claim 10, in which said second bowl in inverted condition has an annular edge received within an annular recess formed in an upper edge of said first bowl and supported on a shoulder formed by said recess.

12. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said second bowl having a side wall projecting upwardly at the outside of said first bowl, said detent means including a rim at the upper edge of said side wall engageable in detenting relation with said first bowl, said second bowl being receivable in inverted condition above the first bowl as a cover therefor, and said first bowl having an upwardly facing support shoulder engageable with said rim in the inverted position of said second bowl to support the second bowl in said inverted position.

13. The combination as recited in claim 12, in which said first bowl has an upwardly extending side wall with an annular outwardly projecting lug engageable with said rim.

14. The combination comprising a first bowl for receiving chilled salad or the like, a second bowl adapted to extend across the underside of said first bowl and upwardly thereabout, and interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall with a top portion projecting upwardly beyond said second bowl in said assembled condition of the bowls, said second bowl having a side wall projecting upwardly at the outside of said first side wall, said detent means including an annular snap detent rib projecting outwardly from said first side wall at a location beneath said top portion thereof, and an annular second rib projecting inwardly from the upper edge of said second side wall and engageable in snap detent relation with said first rib in said assembled condition, said top portion of said first side wall having circularly spaced vertical ribs with lower ends spaced above said annular first rib and engageable with an upwardly facing surface at the top edge of said second side wall in a relation limiting downward movement of said first bowl into said second bowl in said assembled condition, said second bowl in inverted condition being receivable over said first bowl as a cover therefor, said first bowl having an annular recess receiving said second rib in said inverted position of the second bowl and forming an upwardly facing shoulder engaging said second rib in supporting relation.

15. The combination comprising a first bowl for receiving chilled salad or the like, a second bowl adapted to extend across the underside of said first bowl and upwardly thereabout, interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, and a cover adapted to extend over and close the top of said first bowl, said first bowl having an upwardly extending side wall, said detent means including a detent element formed at the outside of said side wall for engagement in releasable detenting relation with said second bowl, and said side wall forming a recess at its upper edge for receiving and supporting a lower edge of said cover.

16. The combination comprising a first bowl for receiving chilled salad or the like, a second bowl adapted to extend across the underside of said first bowl and upwardly thereabout, interfitting detent means on said two bowls retaining them in a predetermined assembled relation with said first bowl projecting downwardly into said second bowl and with a space left between the two bowls for receiving water which is to be frozen to maintain the contents of said first bowl in chilled condition, said detent means being detachable to enable separation of the two bowls for separate cleaning and for filling of water into said space between the bowls, said first bowl having an upwardly projecting side wall with a top portion projecting upwardly beyond said second bowl in said assembled condition of the bowls, said second bowl having a side wall projecting upwardly at the outside of said first side wall, said detent means including an annular snap detent rib projecting outwardly from said first side wall at a location beneath said top portion thereof, and an annular second rib projecting inwardly from the upper edge of said second side wall and engageable in snap detent relation with said first rib in said assembled condition, said top portion of said first side wall having circularly spaced vertical ribs with lower ends spaced above said annular first rib and engageable with an upwardly facing surface at the top edge of said second side wall in a relation limiting downward movement of said first bowl into said second bowl in said assembled condition, and there being a cover adapted to extend over the top of said first bowl, and engageable in supported relation with said top portion of said first side wall at a location spaced above the upper edge of said second bowl.

* * * * *